(12) United States Patent
Bess

(10) Patent No.: US 10,899,107 B2
(45) Date of Patent: Jan. 26, 2021

(54) BUILDING MEMBRANE WITH POROUS PRESSURE SENSITIVE ADHESIVE

(71) Applicant: VAPROSHIELD, LLC, Gig Harbor, WA (US)

(72) Inventor: Daniel Bess, Geneva, OH (US)

(*) Notice: Subject to any disclaimer, the term of this patent is extended or adjusted under 35 U.S.C. 154(b) by 0 days.

(21) Appl. No.: 15/454,233

(22) Filed: Mar. 9, 2017

(65) Prior Publication Data

US 2017/0174952 A1   Jun. 22, 2017

Related U.S. Application Data

(62) Division of application No. 14/121,027, filed on Jul. 22, 2014.

(Continued)

(51) Int. Cl.
*B32B 5/00* (2006.01)
*B32B 5/02* (2006.01)
(Continued)

(52) U.S. Cl.
CPC .................. *B32B 5/26* (2013.01); *B32B 5/00* (2013.01); *B32B 5/022* (2013.01); *B32B 7/04* (2013.01); *B32B 7/12* (2013.01); *B32B 27/00* (2013.01); *B32B 27/06* (2013.01); *B32B 27/18* (2013.01); *B32B 27/32* (2013.01); *B32B 27/36* (2013.01); *B32B 37/12* (2013.01); *C09J 7/21* (2018.01); *C09J 7/255* (2018.01); *C09J 7/38* (2018.01); *C09J 133/08* (2013.01); *E04B 1/625* (2013.01); *E04D 5/10* (2013.01); *E04D 12/002* (2013.01); *B32B 37/1284* (2013.01); *B32B 2037/1253* (2013.01); *B32B 2037/243* (2013.01); *B32B 2255/00* (2013.01); *B32B 2255/02* (2013.01);
(Continued)

(58) Field of Classification Search
None
See application file for complete search history.

(56) References Cited

U.S. PATENT DOCUMENTS

| 4,163,822 A | 8/1979 | Walter |
| 4,655,210 A | 4/1987 | Edenbaum |

(Continued)

FOREIGN PATENT DOCUMENTS

| EP | 0 397 554 B1 | 8/1994 |
| GB | 2473618 A | 3/2011 |

(Continued)

*Primary Examiner* — Kelly M Gambetta
(74) *Attorney, Agent, or Firm* — Janeway Patent Law PLLC; John M. Janeway

(57) ABSTRACT

A breathable multilayer spun bonded polypropylene membrane having a coated pressure sensitive adhesive capable of allowing air and moisture vapor to pass through it. The adhesive is formed of a copolymer comprising a backbone of n-butyl acrylate, 2-ethylhexyl acrylate, and vinyl acetate which is mixed with a surfactant and emulsified to produce bubbles which form pores when the copolymer is set with about 80% to about 90% of the pore sizes ranging from about 200 microns to about 300 microns and a pore density in the cured pressure sensitive adhesive ranging from about 4200 per $inch^2$ to about 4600 per $inch^2$, said pores being uniformly distributed to form a flow path through adhesive.

20 Claims, 3 Drawing Sheets

Related U.S. Application Data

(60) Provisional application No. 61/958,161, filed on Jul. 22, 2013.

(51) Int. Cl.

| | | |
|---|---|---|
| *B32B 5/26* | (2006.01) | |
| *B32B 7/04* | (2019.01) | |
| *B32B 7/12* | (2006.01) | |
| *C09J 7/21* | (2018.01) | |
| *C09J 7/25* | (2018.01) | |
| *C09J 7/38* | (2018.01) | |
| *B32B 27/00* | (2006.01) | |
| *B32B 27/06* | (2006.01) | |
| *B32B 27/18* | (2006.01) | |
| *B32B 27/32* | (2006.01) | |
| *B32B 27/36* | (2006.01) | |
| *B32B 37/12* | (2006.01) | |
| *B32B 37/24* | (2006.01) | |
| *C09J 133/08* | (2006.01) | |
| *E04B 1/62* | (2006.01) | |
| *E04D 5/10* | (2006.01) | |
| *E04D 12/00* | (2006.01) | |

(52) U.S. Cl.
CPC ....... *B32B 2255/10* (2013.01); *B32B 2255/26* (2013.01); *B32B 2262/00* (2013.01); *B32B 2262/0253* (2013.01); *B32B 2305/026* (2013.01); *B32B 2307/3065* (2013.01); *B32B 2307/724* (2013.01); *B32B 2309/02* (2013.01); *B32B 2419/00* (2013.01); *B32B 2419/06* (2013.01); *C09J 2423/10* (2013.01); *C09J 2433/00* (2013.01); *C09J 2467/006* (2013.01); *Y10T 156/10* (2015.01); *Y10T 428/1452* (2015.01); *Y10T 428/249979* (2015.04); *Y10T 442/651* (2015.04)

(56) References Cited

U.S. PATENT DOCUMENTS

| | | |
|---|---|---|
| 5,709,651 A | 1/1998 | Ward |
| 5,993,927 A | 11/1999 | Sugita et al. |
| 6,284,368 B2 | 9/2001 | Muta |
| 6,316,016 B1* | 11/2001 | Iwakawa .......... A01N 25/16 424/409 |
| 2004/0180195 A1 | 9/2004 | Macuga |
| 2005/0214496 A1 | 9/2005 | Borenstein |
| 2007/0212520 A1 | 9/2007 | Furumori et al. |
| 2008/0268224 A1 | 10/2008 | Kim |
| 2011/0185666 A1* | 8/2011 | Russell .......... B32B 7/12 52/408 |
| 2013/0052401 A1* | 2/2013 | Snyder .......... B32B 5/022 428/96 |

FOREIGN PATENT DOCUMENTS

| | | |
|---|---|---|
| JP | 2001003025 A | 1/2001 |
| WO | WO 2009/127819 A1 | 10/2009 |

\* cited by examiner

BUILDING MEMBRANE WITH POROUS PRESSURE SENSITIVE ADHESIVE

CROSS-REFERENCE TO RELATED APPLICATIONS

This is a divisional utility patent application claiming priority and the benefits of U.S. patent application Ser. No. 14/121,027, filed on Jul. 22, 2014 which claims the benefits of U.S. Provisional Patent Application No. 61/958,161, filed Jul. 22, 2013, both of which are incorporated herein by reference in their entireties.

TECHNICAL FIELD OF THE INVENTION

The present invention relates generally to air permeable and water vapor permeable building sheets which are fastened to the building by pressure sensitive adhesive which is coated on a surface of the building sheet.

BACKGROUND OF THE INVENTION

Architects and engineers agree that buildings must be able to breathe; however most commonly used building underlayments and membranes trap condensation and moisture in wall cavities which can lead to poor indoor air quality, energy deficiencies and costly building damage. The North American building industry spends around $9 billion dollars each year repairing and litigating building damages from water and moisture. New materials used in building construction over the last 20 years are energy efficient, but ventilation poor, resulting in toxic mold claims of over $3 billion dollars. Air leakage from such membranes can result in increased energy use of up to 30-40% in heating climates and 10-15% in cooling climates.

Proper building envelope design promotes continual drying by allowing vapor to escape. Moisture can penetrate a building envelope through materials and rain/snow exposure during construction. General occupancy also adds to the moisture levels. Trapped moisture can cause wood rot, swelling and distortion of lumber, corrosion of metal and reduction of insulation thermal value. Any or all of these issues result in a high risk of mold, mildew, building deterioration, poor indoor air quality and health and safety risks to the occupant. In some states, new air tightness and energy saving requirements increase the possibility of trapped moisture, when low or non-permeable air barriers are utilized.

Current building construction uses barrier sheets or membranes to form an envelope around the construction to allow the transport of moisture into and out of a building and to control the movement of air through a wall or roof covered by the barrier sheet. Common commercial barrier sheets or membranes are sold under the TYVEK® Commercial, TYPAR®, and DOW WEATHERMATE PLUS® brands. These and other commercial barrier sheets commonly use adhesive which is applied to the sheet so that the same can be secured to a wall or roof. Problems which occur in these commercial usages is that the adhesive used is not pressure sensitive or that it may not be porous to allow water vapor transmission.

It is well known to provide a planar carrier membrane with an adhesive application which is limited on the surface area or interrupted by adhesive free places. It is also well known to perforate the adhesive composition after placement on the planar carrier membrane with mechanical means or with the aid of air nozzles so that the entire surface of the planar carrier is perforated.

Medical dressings or sheets have used a porous adhesive coated over a substrate surface to allow air flow to reach the wound and allow moisture to be transmitted away from the wound. Examples of such dressings having pores formed in the pressure sensitive adhesive are described in U.S. Pat. No. 4,163,822 issued Aug. 7, 1979 and U.S. Pat. No. 5,709,651 issued Jan. 20, 1998. A porous adhesive for corrugated cardboard is disclosed in U.S. Patent Application Publication Number 2008/0268224 published Oct. 30, 2008. These sheets perform in the same manner as construction barrier sheets, albeit in a smaller surface application area with different substrates. A large surface construction barrier sheet using a vapor permeable adhesive is described in U.S. Patent Application Publication Number 2011/0018566 published on Aug. 4, 2011. The corresponding United States equivalent is U.S. patent application Ser. No. 12/937,823 filed Apr. 15, 2011.

Many construction barrier sheets currently in use are formulated to be weather resistant keeping out water and resisting wind pressure. These sheets are secured to studs and form an "envelope" underneath exterior cladding or roofing. Some commercial barrier sheets are both water vapor permeable and air permeable but have limited pressure sensitive adhesive applied to specific areas of their inner surface. Thus, there exists a need for a highly water vapor permeable and air permeable adhesive which can be applied to the entire inner surface of the barrier sheet allowing it to be easily mounted to studs or the like. The present membrane has uniform vapor permeable characteristics over the surface of the barrier sheet with pores in the adhesive uniformly distributed to form a flow path through the adhesive.

SUMMARY OF THE INVENTION

A breathable multilayer spun bonded polypropylene membrane having a coated pressure sensitive adhesive capable of allowing air and moisture vapor to pass through it. The adhesive is formed of a copolymer comprising a backbone of n-butyl acrylate, 2-ethylhexyl acrylate, and vinyl acetate which is mixed with a surfactant and emulsified in a foam mixer to produce a precisely homogenized mix of adhesive and air bubbles which form pores when the copolymer is set. About 80% to about 90% of the pore sizes in the foamed adhesive range from about 200 microns to about 300 microns and the cured pressure sensitive adhesive has a pore density ranging from about 4200 per $inch^2$ to about 4600 per $inch^2$, with the pores being uniformly distributed and forming a flow path through the adhesive.

It is an object of the present invention to provide a membrane with a pressure sensitive adhesive which is porous with the pores being interconnected allowing vapor transmission through the adhesive.

It is another object of the invention to provide a membrane with a pressure sensitive adhesive covering the entire inner surface of the membrane which allows air and water vapor to be circulated through the adhesive.

It is yet another object of the invention to provide a pressure sensitive porous adhesive which has fire retardant capabilities.

These and other objects, advantages, and novel features of the present invention will become apparent when considered with the teachings contained in the detailed disclosure along with the accompanying drawings.

DETAILED DESCRIPTION OF THE INVENTION

The preferred embodiment and best mode of the invention is shown in FIGS. 1-4.

Figure 1:
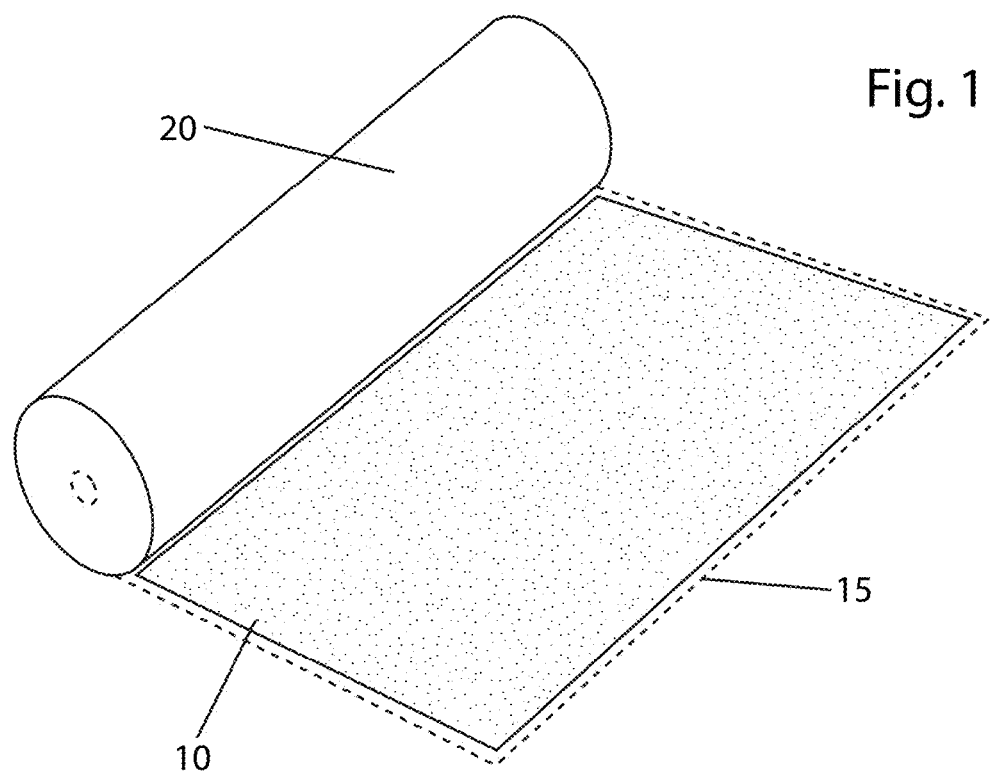
FIG. 1 is a perspective view of a roll of the inventive construction membrane.
Figure 2:
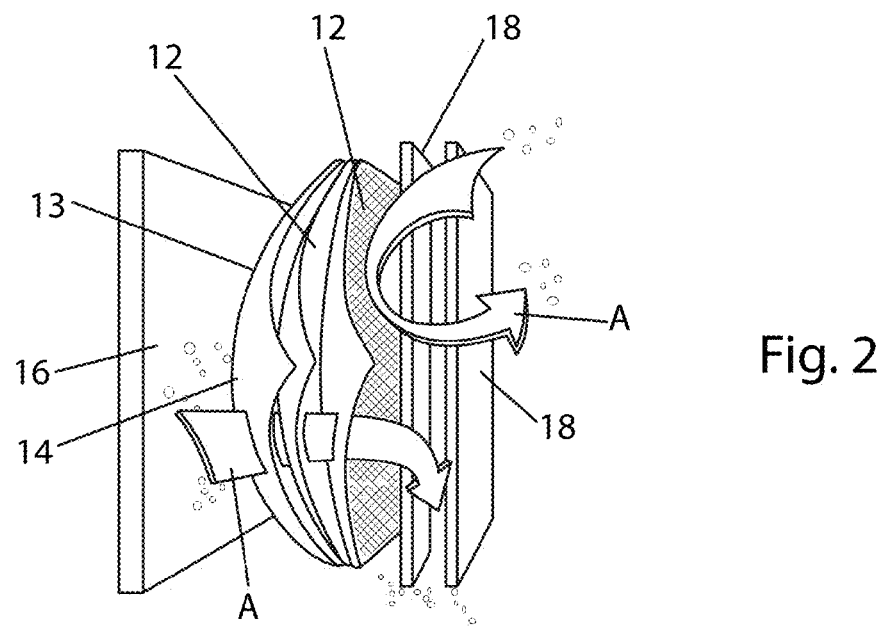
FIG. 2 is an enlarged cross sectional view of the construction membrane shown in FIG. 1.
Figure 3:
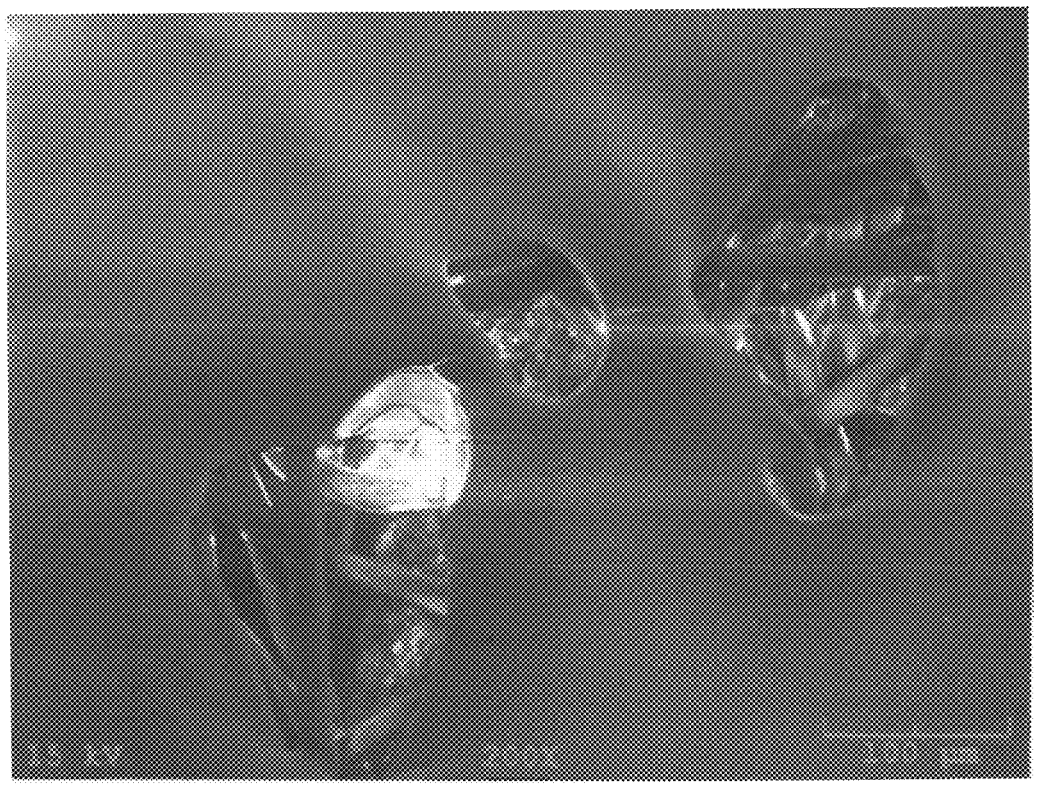
FIG. 3 is a scanning electron microscopy photograph of the porous adhesive used with the construction membrane at 50× magnification.

A building construction envelope or laminate membrane 10 is constructed of multilayer sheets 12 of spun bonded porous polypropylene secured to a liner 13 having a layer of porous pressure sensitive adhesive 14 coated over the entire surface. The adhesive surface is covered by a removable film cover 15. When the film cover is removed, the membrane is mounted to a wall board 16 or roofing material. Cladding 18 in the form of one or more sheets of material is fastened over the outer surface of membrane 10 as shown in FIG. 2. Air and vapor flow is shown by Arrows A.

Each sheet 12 is constructed of non-woven polypropylene fibers and the sheets are secured together to form a laminate. The membrane 10 is produced as a roll of sheet material 20, preferably 164 feet in length and with a width of 58-60 inches. The membrane 10 is water resistant with air permeability and has a water vapor transmission greater than 20 Perms, preferably ranging from 50 to 70 Perms. The produced membranes are inert and can be recycled into their original bed form for reuse.

The pressure sensitive porous adhesive 14 is coated onto the bottom layer or liner 13 of spun bonded polypropylene liner sheet which is secured as is well known in the art to another sheet or sheets of spun bonded polypropylene 12 to form a laminate membrane 10. The composite structure of the present invention has a high vapor permeability (50-70 Perms) and the adhesive breathes allowing vapor to escape and air to circulate while being water resistant.

A Perm is a unit of water vapor transmission defined as 1 grain of water vapor per square foot per hour per inch of mercury pressure difference (1 inch mercury=0.49 psi). The metric unit of measure is ng/m2 s Pa. 1 perm=55 ng/m2 s Pa. Permeability is the time rate of water vapor transmission through unit area of a material of unit thickness induced by unit vapor pressure difference between two specific surfaces, under specified temperature and humidity conditions. Membranes with a higher Perm value greater than 20 reduce the risk of condensation and promote escape of moisture through the building envelope. Additionally, membranes with a high Perm value can help building materials dry-out during the construction phase.

The copolymer portion of the pressure sensitive adhesive (PSA) has a backbone consisting of n-butyl acrylate, 2-ethylhexyl acrylate, and vinyl acetate. The structure of the backbone is shown in Table I below as follows:

TABLE I (Structure of PSA Polymer Backbone)

$$\left(\begin{array}{cc} A & B \\ -CH_2-CH- \end{array}\right) \left(\begin{array}{cc} G & H \\ -CH_2-CH- \end{array}\right) \left(\begin{array}{cc} Q & R \\ -CH_2-CH- \end{array}\right)$$

| | | |
|---|---|---|
| C=O | C=O | O |
| O | O | C=O |
| C CH$_2$ | I CH$_2$ K L | S CH$_3$ |
| D CH$_2$ | M CH$_2$—CH—CH$_2$—CH$_3$ | Vinylacetate |
| E CH$_2$ | J | |
| | N CH$_2$ | |
| F CH$_3$ | O CH$_2$ | |
| n-Butylacrylate | P CH$_3$ | |
| | 2-Ethylhexylacrylate | |

The adhesive fully bonds to almost any substitute for air tightness and ease of installation and requires no primer.

The pressure sensitive adhesive (PSA) is an acrylic solution. The polymeric portion of the PSA makes up at least 95% of the adhesive formulation and has a copolymer backbone of n-butyl acrylate (about 60% by weight), 2-ethylhexyl acrylate (about 32% by weight) and vinyl acetate (about 7% by weight) forming a copolymer solvent blend capable of accepting water. Proper foaming of the adhesive is critical to good micropore formation. The aeration process includes high sheer mixing to entrain air in the mixed liquid solution. Once the proper foam level is produced, the adhesive needs to be coated on the liner and the micropores formed. The coating method used with the present invention was a blade coater. This is a non-contact coating method and it does not crush or destroy the foam during coating. It should be noted that other coating methods such as Meyer rod, comma coating and pattern bar coating were attempted but found to be detrimental to suitable micropore formation. After coating, the adhesive must be heated to lock-in the micropore formation. The adhesive in the present invention was reformulated by adding surfactants and water to the copolymer to control bubble size, bubble density, viscosity, and stability of the copolymer. The peel value of the adhesive is reduced by the introduction of voids (air bubbles) and the addition of surfactant such as long chain alcohols create a stable inverse emulsion. The peel value of the presently formulated adhesive during testing using dynamic peel data from stainless steel (Peel Adhesion ASTM D-3330) was about 25 oz. in at 1 minute; 27.5 oz. in at 10 minutes and 36.5 oz. in at 24 hours.

Figure 4:
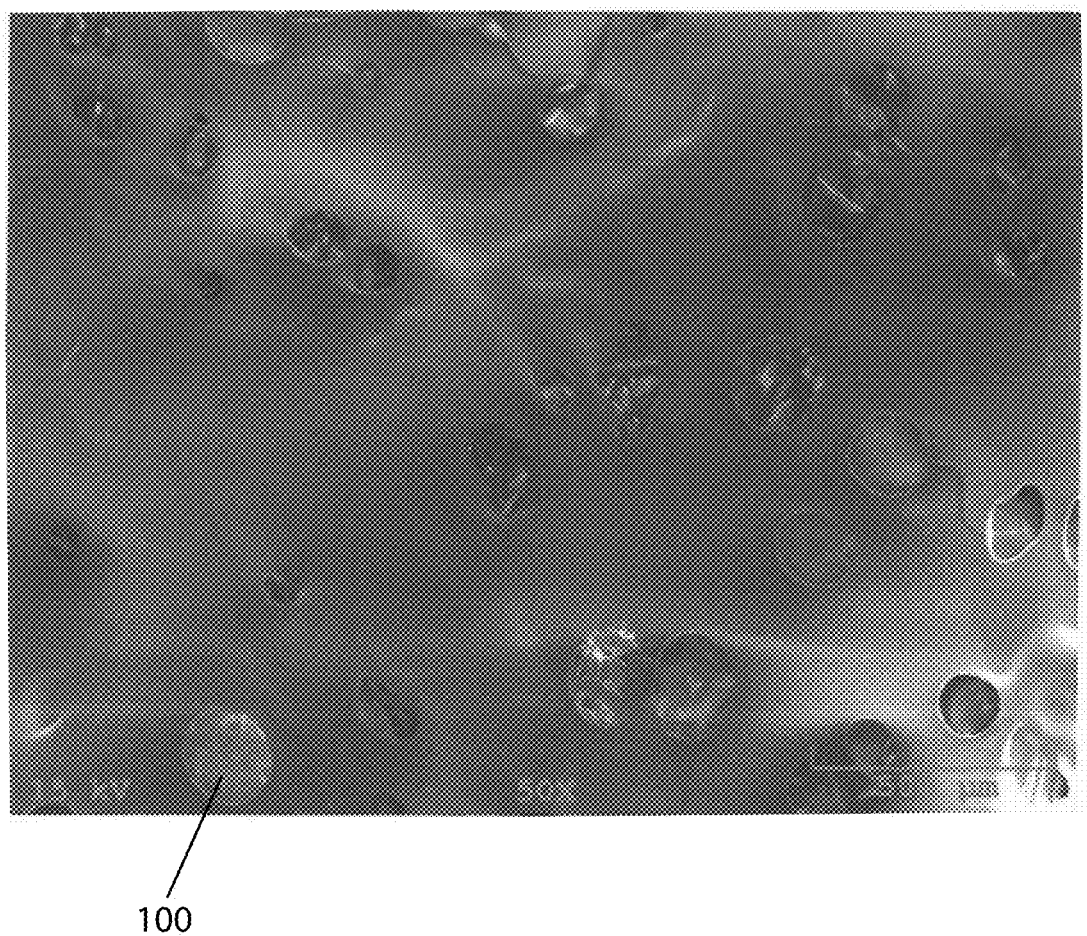
FIG. 4 is a scanning electron microscopy photograph of the porous adhesive used with the construction membrane at 200× magnification.

Microscopy of the modified adhesive surface was performed revealing a porous structure of the inventive adhesive having a bubble density (number of pores) ranging from about 4000 pores in 1.0 in$^2$ to about 4600 pores in 1.0 in$^2$, preferably about 4400 pores in 1.0 in$^2$ with a majority of the pores, preferably about 80% to about 90% of the bubbles/pores having a size ranging from about 200 microns to about 300 microns. See FIGS. 3 and 4. The pores formed are generally round and oval in shape and form a vapor pathway through the adhesive layer. The majority of the pores 100 formed by the bubbles appear to be distributed evenly across the surface penetrating through the adhesive layer when the polymer mixture is heat treated to set the pores in the adhesive. The pore distribution is shown in FIG. 4. Preferably, the density of the foamed adhesive should fall between about 0.65 and about 0.75 after aeration.

The reformatted PSA was manufactured as follows:

The adhesive copolymer as shown in Table I ranged from about 45% by weight to about 50% by weight, preferably about 48% to about 49% by weight. The copolymer was mixed with a first solvent-free, surfactant-based wetting agent, preferably ranging from about 4% by weight to about 6% by weight, and most preferably about 5% by weight to provide emulsification and bubble size; and a second surfactant such as a foaming agent ranging from about 1.5% by weight to about 2.0% by weight, and preferably about 1.7% by weight to provide foam formation. A polymeric based water thickener was added to the mixture in a range from about 0.2% by weight to about 0.4% by weight, preferably about 0.30% by weight. The composition was added to water ranging from about 40% by weight to about 50% by weight, preferably about 43% by weight to about 45% by weight and mixed in a high speed dispersion mixer at 500 rpm to form uniform bubbles in the mixture and fed into a coater feeder as previously described. The foamed adhesive was coated onto a porous polypropylene liner sheet and heat cured to form an adhesive laminate with pores in place. The adhesive coated porous liner was then secured to a laminate constructed of spun polypropylene. The resultant foamed adhesive had average MVTR (g/m²day) of about 500 with a Peel adh @180° (measured stability) ranging from about 65 to 15, preferably about 40.

The pressure sensitive porous adhesive construction membrane is preferably made by adding a coating of adhesive to the bottom or liner sheet with the composition of the adhesive noted above. The porous adhesive is manufactured in the following steps:

A copolymer with a backbone of n-butyl acrylate (about 60% by weight), 2-ethylhexyl acrylate (about 32% by weight) and vinyl acetate (about 7% by weight) is added to a container;

Water is added in an amount ranging from about 40% by weight to about 50% by weight to the copolymer and mixed to lower viscosity;

A first surfactant ranging from about 4% to about 5% by weight is added to the copolymer/water mixture to provide emulsification;

A second surfactant ranging from about 0.15% to about 0.4% by weight is added to the mixture and mixed for about 20 minutes to provide thickening;

The final adhesive mixture is moved to a high speed dispersion mixer to aerate the adhesive mixture, mixed for about 10 to about 15 minutes at about 5000 rpm to provide emulsification forming the bubbles throughout the adhesive and poured into a coater feeder;

The aerated adhesive is coated onto a release liner using a blade coater which coats the liner between 3 and 5 mils thickness with the preferred thickness being about 4.0 mils;

The adhesive coated liner is dried and heat cured at temperatures ranging from about 165° F. to about 265° F. for a sufficient time to form a laminate and cure or set the bubbles (pores) in place; and Spun polypropylene laminate is then secured to a porous adhesive liner.

In a modified version, a flame retardant material Antimony Oxide was added to the adhesive mixture at about 2% by weight to about 3% by weight. Other flame retardant materials suitable for use with the adhesive may include halogenated fire suppressants, hydrated inorganic compounds such as aluminum trihydrate, magnesium hydroxide, calcium borate and zinc borate, intumescent phosphate, ammonium polyphosphate, organic and inorganic phosphate compounds such as ammonium sulfate, sulfamate compounds and free radical scavenger materials such as antimony trioxide.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. A process for making a water resistant, air permeable and vapor permeable membrane with a permeable pressure sensitive adhesive (PSA) backing comprising the steps of:
    a) adding water in an amount ranging from about 40% to about 50% by weight to an acrylic copolymer pressure sensitive adhesive ranging from about 45% to about 50% by weight and mixing same to reduce the viscosity of the solution;
    b) adding at least one solvent-free surfactant to the water copolymer solution and mixing same for a suitable time period to form air bubbles entrained throughout the copolymer pressure sensitive adhesive and surfactant solution;
    c) pouring the bubble containing solution of adhesive and surfactant into a coater;
    d) coating the bubble containing solution of adhesive and surfactant onto a water resistant vapor permeable polyester membrane to cover a surface of said membrane with a coating having thickness ranging from about 3 mils to about 5 mils;
    e) heating the coated membrane at a suitable temperature for a suitable time to cure the pressure sensitive adhesive solution with the entrained bubbles to form interconnected pores in the now permeable coating; and
    f) mounting a removable release cover to the coating over the cured pressure sensitive adhesive.

2. A process for making a water resistant air permeable and vapor permeable membrane as claimed in claim 1 wherein said coating is heated at a temperature ranging from about 165° to about 265° F.

3. A process for making a water resistant air permeable and vapor permeable membrane as claimed in claim 1 in step b) wherein said mixing is accomplished by a high speed dispersion mixer rotated at about 5000 rpm.

4. A process for making a water resistant air permeable and vapor permeable membrane as claimed in claim 1 step b) wherein about 80% to about 90% of said formed air bubbles are sized from about 200 to about 300 microns.

5. A process for making a water resistant air permeable and vapor permeable membrane as claimed in claim 1 wherein after step b) a fire retardant material is added to the copolymer surfactant mixture in the amount of about 2% to about 3% by weight.

6. A process for making a water resistant air permeable and vapor permeable membrane as claimed in claim 1 wherein the coating of step d) is applied with a blade coater.

7. A process for making a water resistant, air permeable and vapor permeable membrane with a porous pressure sensitive adhesive (PSA) copolymer backing comprising the steps of:
    a) adding water in an amount ranging from about 40% to about 50% by weight to a pressure sensitive adhesive copolymer having a backbone of n-butyl acrylate, 2-ethylhexyl acrylate, and vinyl acetate and mixing the water and pressure sensitive adhesive copolymer to form a solution;

b) adding a surfactant to said solution to provide for emulsification;

c) adding a second surfactant to said solution to provide a foaming agent;

d) adding a thickener to said solution of step c) and mixing the solution in a sheer mixer at a rate of speed for a suitable time to form and entrain air bubbles in said solution having a designated size range throughout the solution;

e) transferring the bubble containing solution into a coater feeder;

f) coating the adhesive surfactant thickener solution onto a water resistant vapor permeable spun polypropylene membrane to cover the surface of said membrane with said coating having a thickness ranging from about 3 mils to about 5 mils;

g) heating the coated membrane at a suitable temperature to accomplish curing of the adhesive surfactant thickener composite solution for a suitable time to cure said entrained air bubbles in place forming interconnected pores in the cured pressure sensitive adhesive; and h) securing a removable release cover to the coated membrane pressure sensitive adhesive.

8. A process for making a water resistant air permeable and vapor permeable membrane as claimed in claim 7 wherein a fire retardant material is added to the water copolymer surfactant solution after step c).

9. A process for making a water resistant air permeable and vapor permeable membrane with a porous pressure sensitive adhesive (PSA) backing comprising the steps of:

a) adding water in an amount ranging from about 40% to about 50% by weight to a pressure sensitive adhesive to form a water adhesive mixture, said pressure sensitive adhesive having a copolymer backbone of n-butyl acrylate, 2-ethylhexyl acrylate, and vinyl acetate and mixing said water adhesive mixture to form a uniform solution;

b) adding at least one surfactant to the uniform water copolymer solution and mixing same to form a pressure sensitive adhesive solution;

c) mixing said pressure sensitive adhesive solution for a suitable time in a sheer mixer forming air bubbles throughout the water, copolymer pressure sensitive adhesive and surfactant solution;

d) pouring the air bubble containing solution of water, copolymer pressure sensitive adhesive and surfactant into a coater assembly;

e) coating the bubble containing solution onto a water resistant vapor permeable polyester membrane to cover an outer surface of said membrane with a coating having a thickness which will entrain air bubbles ranging from about 200 microns to about 300 microns in size;

f) heating the coated membrane at a suitable temperature for a suitable time to cure the air bubbles in place in the bubble containing solution to form a cured pressure sensitive coating with interconnected pores positioned throughout the coating with some of said interconnected pores penetrating the surface of the coating to create a vapor permeable coating; and g) mounting a removable release cover to the coated, membrane pressure sensitive adhesive.

10. A process for making a water resistant air permeable and vapor permeable membrane with a porous pressure sensitive adhesive copolymer coating as claimed in claim 9 wherein in step c) 80% to about 90% of said formed air bubbles are sized from about 200 to about 300 microns.

11. A process for making a water resistant air permeable and vapor permeable membrane as claimed in claim 9 wherein said coated membrane is cured in step f) at a temperature ranging from about 165° F. to about 265° F.

12. A process for making a water resistant air permeable and vapor permeable membrane as claimed in claim 9 wherein said at least one surfactant are two surfactants, one surfactant to provide emulsion and air bubble size and a second surfactant being a foaming agent.

13. A process for making a water resistant air permeable and vapor permeable membrane as claimed in claim 9 wherein in step c) said surfactant, water and copolymer pressure sensitive adhesive mixture solution is mixed in a sheer mixer to entrain air bubbles uniformly in said solution.

14. A process for making a water resistant air permeable and vapor permeable membrane as claimed in claim 9 wherein said at least one surfactant includes a long chain alcohol which creates a stable emulsion.

15. A process for making a water resistant air permeable and vapor permeable membrane as claimed in claim 9 wherein said coated membrane is cured in step f) at a temperature ranging from about 165° F. to about 265° F.

16. A process for making a water resistant air permeable and vapor permeable membrane as claimed in claim 9 step c) wherein about 80% to about 90% of said formed air bubbles range in size from about 200 microns to about 300 microns.

17. A process for making a water resistant air permeable and vapor permeable membrane as claimed in claim 9 wherein said formed pores are generally round and oval in shape and are evenly distributed throughout the adhesive coating and across the coating surface to form a vapor pathway through the adhesive coating.

18. A process for making a water resistant air permeable and vapor permeable membrane as claimed in claim 9 wherein said mixing in step c) is undertaken by a high speed dispersion mixer mixed at about 5000 RPM for about 10 minutes to about 15 minutes to provide emulsification forming the bubbles throughout the adhesive solution.

19. A process for making a water resistant air permeable and vapor permeable membrane as claimed in claim 9 wherein said coater assembly is a blade coater.

20. A process for making a water resistant air permeable and vapor permeable membrane as claimed in claim 7 wherein said first surfactant is a solvent-free wetting agent to provide emulsification and bubble size ranging from about 4% by weight to about 6% by weight and said second surfactant is a foaming agent ranging from about 1.5% by weight to about 2.0% by weight.

* * * * *